(12) United States Patent
Gleasman

(10) Patent No.: US 7,367,637 B2
(45) Date of Patent: May 6, 2008

(54) ENDLESS TRACK FOR HIGH SPEED MULTI-TERRAIN VEHICLES

(75) Inventor: Keith E. Gleasman, Fairport, NY (US)

(73) Assignee: Torvec, Inc., Rochester, NY (US)

( * ) Notice: Subject to any disclaimer, the term of this patent is extended or adjusted under 35 U.S.C. 154(b) by 158 days.

(21) Appl. No.: 11/153,114

(22) Filed: Jun. 15, 2005

(65) Prior Publication Data

US 2006/0284484 A1 Dec. 21, 2006

(51) Int. Cl.
*B62D 55/24* (2006.01)

(52) U.S. Cl. .................. 305/165; 305/157; 305/178

(58) Field of Classification Search ............... 305/165, 305/167, 170, 178, 184, 157, 158, 160, 171, 305/177, 180, 168, 172, 173, 174, 175, 176, 305/179

See application file for complete search history.

(56) References Cited

U.S. PATENT DOCUMENTS

| 3,107,128 | A | | 10/1963 | Ruane | 305/178 |
|---|---|---|---|---|---|
| 3,619,012 | A | | 11/1971 | Bizier et al. | 305/168 |
| 4,410,219 | A | | 10/1983 | van der Lely | 305/180 |
| 4,846,091 | A | | 7/1989 | Ives | 440/12.63 |
| 5,352,029 | A | | 10/1994 | Nagorcka | 305/199 |
| 5,632,537 | A | * | 5/1997 | Yoshimura et al. | 305/173 |
| 5,894,900 | A | | 4/1999 | Yamamoto et al. | 180/9.36 |
| 6,065,818 | A | | 5/2000 | Fischer | 305/179 |
| 6,135,220 | A | | 10/2000 | Gleasman et al. | 180/9.1 |
| 6,241,327 | B1 | * | 6/2001 | Gleasman et al. | 305/157 |
| 6,406,106 | B1 | * | 6/2002 | Moss | 305/165 |
| 6,505,896 | B1 | * | 1/2003 | Boivin et al. | 305/178 |
| 6,935,708 | B2 | | 8/2005 | Courtemanche | 305/165 |
| 2004/0080210 | A1 | * | 4/2004 | Deland et al. | 305/178 |
| 2005/0156466 | A1 | * | 7/2005 | Dandurand et al. | 305/180 |

FOREIGN PATENT DOCUMENTS

| JP | 55-072469 | | 5/1980 |
|---|---|---|---|
| JP | 55-079764 | | 6/1980 |
| JP | 11245861 A | * | 9/1999 |

* cited by examiner

*Primary Examiner*—Russell D. Stormer
*Assistant Examiner*—Kip Kotter
(74) *Attorney, Agent, or Firm*—Brown & Michaels, PC

(57) ABSTRACT

The track design for use with a tracked vehicle includes a cantilever cut made down into the outward side of each tread just outboard of the position where the inside of the track contacts the outboard edge of the tread of the outer wheel of each pair of track-supporting dual wheels. This cut significantly reduces lateral "roll-out" of the guide lugs from between the dual wheels when traversing uneven surfaces. When the outer edge of the track passes over sharply uneven terrain, this cut in the tread allows the outer edge of the track belt to lift away from the flat main surface under the wheels. Thus the interior surface of the track maintains contact with both tires of each pair of dual wheels by reducing twisting of the track belt that may cause the guide lugs to tip out of the mating surfaces formed between the dual-wheel pairs.

16 Claims, 3 Drawing Sheets

ENDLESS TRACK FOR HIGH SPEED MULTI-TERRAIN VEHICLES

BACKGROUND OF THE INVENTION

1. Field of the Invention

The invention pertains to the field of endless tracks used to propel track-laying vehicles. More particularly, the invention pertains to an improved track design for a track-laying vehicle.

2. Description of Related Art

Many track-laying vehicles are driven and supported by rubber tracks. As used herein, the term "rubber" relates to any elastic and primarily non-metallic materials such as rubber, elastomers, or combinations thereof used in the manufacture of endless tracks.

There is presently an acute need for a form of vehicle appropriate for both normal highway use and off-road use over snow-covered, uneven, or muddy terrain. There is significant need for such a vehicle following natural emergencies such as snowstorms, windstorms, and floods, and such vehicles are at present particularly needed in developing countries. Unfortunately, almost all available automotive vehicles require infrastructure, including paved highways and bridges, for practical operation, and the developing countries are decades away from having the necessary infrastructure for such conventional vehicles.

Rubber endless tracks are well known and provide supporting contact between a track-laying vehicle and the terrain over which the vehicle is to be moved. The tracks are carried by a plurality of rotating elements, such as wheels and sprockets, mounted on the track-laying vehicle. The tracks are maintained in circumferential contact with these rotating elements and are driven thereby, or, in the case of trailer-like non-driven vehicles, are supported for rotation thereon.

Most tracks are formed around a basic carcass or belt element having respective interior and exterior surfaces with a predetermined width dimension co-extensive with the track's overall track width. Terrain-contacting lugs are formed integral with the exterior surface of this basic belt element. Known rubber tracks include large lugs having a variety of well-known orientations. The external lugs are formed generally perpendicular to the track axis, at an angle to the track axis, or in a chevron or modified-chevron design.

One special variety of such tracks, disclosed in U.S. Pat. No. 6,135,220 by the inventor of the present invention and incorporated herein by reference, is designed to be driven by rubber-tired wheels and has been shown appropriate for the needs of multi-use tracked vehicles that are capable of being driven at highway speeds on paved highways in addition to use over uneven off-road terrain. These special tracks include interior lugs for maintaining the track in alignment as it travels over the circumferences of the rubber-tired wheels. The lugs are located in the center of the interior surface of the track for designs appropriate for fitting between the tires of dual-wheels or in two aligned rows near the outside edges of the track for receiving a single tire therebetween.

Other known rubber tracks, when mounted on the rotating wheels of vehicles, exert resistive forces that must be overcome to move the vehicle, specifically, resistive forces in addition to those forces created by the load being carried and/or generated by the terrain. These further resistive forces relate to the additional tensions required to stretch the heavy lugs of the tracks around the wheels over which they are mounted and to the additional friction generated between the tracks and the terrain. While the latter frictional resistive forces are a valuable attribute under wet or snowy conditions, they add undesirably to energy costs when driving the vehicle over flat, hard surfaces.

U.S. Pat. No. 6,241,327, also by the inventor of the present invention and incorporated herein by reference, discloses improvements to track designs that increase the efficiency of the off-road/highway-speed tracks specifically designed for multi-use tracked vehicles. In one improvement, a relatively thin cut is made in each lug portion of the tracks. In the preferred embodiments of the invention, the cut is made perpendicular to the track's central plane and parallel to the axes of the vehicle's rotating drive/support elements, and the cut is made throughout substantially the entire thickness dimension of each lug down to the exterior surface of the carcass belt. This improvement reduces the force required to stretch the heavy lugs of the track as the track changes direction when being moved over the circumferential surfaces of the rotating elements of the vehicle's track suspension system.

In a second improvement in U.S. Pat. No. 6,241,327, the track design includes a lug modification that is particularly applicable to those endless tracks used for suspension systems in which the track is supported and driven by rubber-tired wheels. This further modification selectively reduces the thickness of each lug by tapering each lug outboard of that central portion of the basic carcass/belt that is in direct contact with the rubber-tired supporting wheels. This modification reduces drag when driving over paved surfaces, while still providing desired additional traction when traversing wet or snow-covered terrain. This taper also facilitates pivot turning.

Prior to the present inventor's track design, load-carrying off-road vehicles had either very large wheels or very cumbersome tracks, which are heavy, slow-moving, and inappropriate for use on paved roads at normal highway speeds. While smaller all-terrain wheeled vehicles are commercially available, these do not carry adequate loads for normal multi-passenger or produce transport, and their drive wheels can easily become mired in heavy mud or snow. Therefore, track-laying vehicles of the type disclosed in the above-identified patents promise great utility for the future.

Although the track designs patented in U.S. Pat. No. 6,241,327 offer superior combinations of off-road, highway speed, and load carrying capabilities, the present inventor has found that under certain conditions the endless track may experience an undesirable "roll-out". That is, when only the outer edge of the track passes over a sharply uneven terrain, a severe twisting of the track belt can, in some instances, cause the guide lugs to tip out of the mating surfaces formed between the two supporting dual wheels, thereby dislodging the endless track laterally out of its normal alignment. Therefore, there is a need in the art for an improved endless track design with reduced roll-out.

SUMMARY OF THE INVENTION

An endless rubber track is disclosed for use with a track-laying vehicle having a plurality of rotating elements for receiving and rotating the track so that the track provides supporting contact between the vehicle and the terrain over which the vehicle is to be moved. The endless track includes an endless belt having a terrain-facing surface and a frictional contact surface facing inward from the belt for frictional contact with at least two of the rotating elements. The track also includes (a) a main section that extends laterally between a pair of outer planes each perpendicular to the frictional contact surface and (b) a cantilevered outer section extending laterally from the main section to a respective outer edge of the frictional contact surface. A plurality of terrain-contacting lugs is formed integral with and extending outward from the terrain-facing surface.

In the improved track design disclosed, a cantilever cut, preferably a fore-and-aft cut, is made in each terrain-contacting lug just outboard of the track's main section. This cut significantly reduces lateral "roll-out" of the guide lugs from between the two supporting dual wheels when traversing uneven surfaces. That is, when the outer edge of the track passes over a sharply uneven terrain, this cut in each tapered lug allows the outer edge of the track belt to lift away from the flat surface of the main section under the wheels, thereby preventing severe twisting of the track belt that might otherwise cause the guide lugs to tip out of the mating surfaces formed between the two supporting dual wheels. While the invention is applicable to endless tracks for all track-laying vehicles, it particularly improves the performance of such new track-laying all-terrain vehicles of the type specifically designed for normal speed travel over paved highways as well as for appropriate use over unpaved roads and uneven off-road terrain.

The endless rubber track is for use with a track-laying vehicle having a plurality of rotating elements for receiving and rotating the track so that the track provides supporting contact between the vehicle and a terrain over which the vehicle is to be moved. The endless track includes an endless belt having a terrain-facing surface facing outward from the belt and a frictional contact surface facing inward from the belt for frictional contact with at least two of the rotating elements. The belt includes a main section extending laterally between a pair of outer planes each perpendicular to the frictional contact surface and at least a first cantilevered outer section extending laterally from the main sections to a first respective outer edge of the frictional contact surface. The endless track further includes a plurality of terrain-contacting lugs formed integral with and extending outward from the terrain-facing surface. Each lug has a lug-thickness dimension. The plurality of terrain-contacting lugs includes at least one lateral lug extending laterally from the main section into the first cantilever section. The endless track further includes a cantilever cut in each lateral lug oriented parallel to a direction of travel of the track.

The cantilever cut is preferably a fore-and-aft cut. The width of the cantilever cut preferably extends laterally from the main section to the first cantilever section. The cantilever cut preferably has a width-to-depth ratio of 1:1 or less. The cantilever cut preferably has a depth of at least half of the lug-thickness dimension. In a preferred embodiment, the cantilever cut has a depth equal to the lug-thickness dimension.

In another preferred embodiment, a second cantilevered outer section extends laterally from the main section to the second respective edge of the frictional contact surface, and the plurality of terrain-contacting lugs includes at least one second lateral lug extending laterally from the main section into the second cantilevered outer section. A second cantilever cut is made into each second lateral lug and oriented parallel to the direction of travel of the track. Each second cantilever cut preferably has characteristics similar to the cantilever cuts made in the lateral lugs of the first cantilevered outer section.

The plurality of terrain-contacting lugs is preferably arranged in a staggered-chevron configuration. The lug-thickness dimension of each terrain-contacting lug preferably has at least one tension-reducing cut formed therein, where the tension-reducing cut is oriented perpendicular to the direction of travel of the belt. The tension-reducing cut is preferably made through the entire lug-thickness dimension of each lug. The thickness of the terrain-contacting lugs in the cantilever section preferably tapers from the outer plane to the respective outer edge of the frictional contact surface.

In yet another preferred embodiment, the rotating elements include individual wheels covered by rubber tires. The endless track preferably includes a plurality of alignment lugs formed integral with and extending outward from the frictional contact surface to maintain the alignment of the track relative to the circumferential surfaces of the tires. The rotating elements preferably further include dual-wheel sets, covered by rubber tires and fixed to rotate together with a predetermined axial distance between the individual wheels of each dual-wheel set. The alignment lugs are preferably spaced from each other in alignment with a central plane of the track, where the alignment lugs have a width selected to mate with the predetermined axial distance between the individual wheels of each dual-wheel set for centering the track thereon.

DETAILED DESCRIPTION OF THE INVENTION

Figure 1:
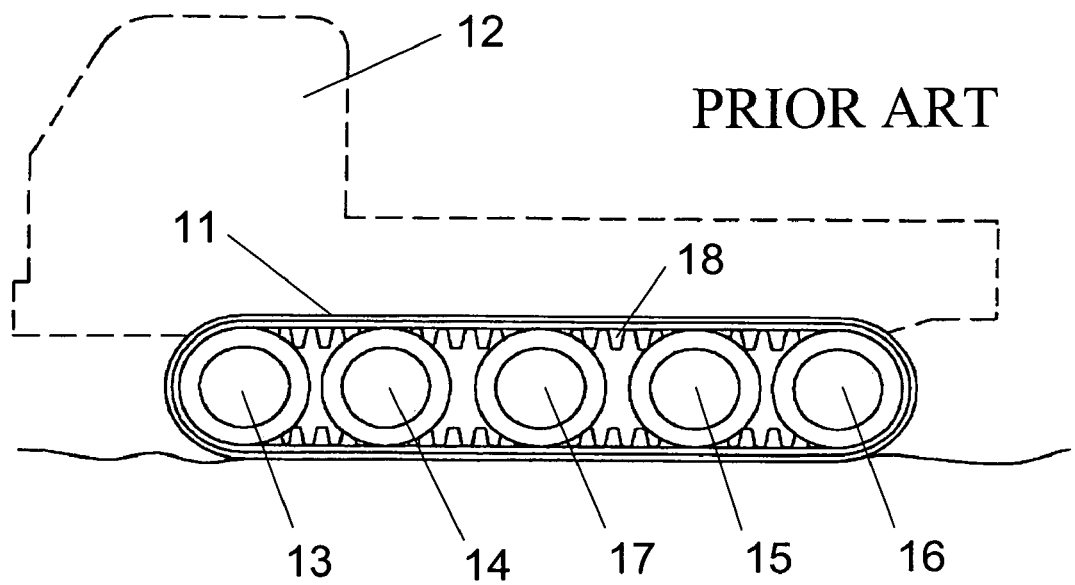
FIG. 1 shows a side view of a rubber endless track of the prior art.

The invention herein modifies the outward-facing tread of a conventional rubber track to reduce instances of track roll-out, where the endless track may be dislodged laterally out of its normal alignment during operation of the vehicle. A cut is made down into the outward side of each tread just outboard of the position where the inside of the track contacts the outboard edge of the tread of the outer of the dual wheels of each pair of track-supporting dual wheels. While the invention is generally applicable to most rubber endless tracks, the just-described prior art track illustrated schematically in FIGS. 1 through 3 represents a specialized design disclosed in U.S. Pat. No. 6,241,327, for which the present invention is especially applicable. This specialized track is not sprocket-driven but instead is stretched over wheels covered with rubber tires and is driven solely by frictional contact between the tires and the interior surface of the track. The present invention has particular applicability to such frictionally driven tracks.

Referring to FIG. 1, a rubber endless track 11 is mounted to a track-laying vehicle 12 by being suspended over two pairs of tandem, tire-covered wheels 13, 14 and 15, 16 as well as an idler wheel 17; two of the wheels 13 and 15 are drive wheels for causing the rotation of the track 11. The rubber endless track has a plurality of guide lugs 18 interiorly located on the track.

Figure 2A:
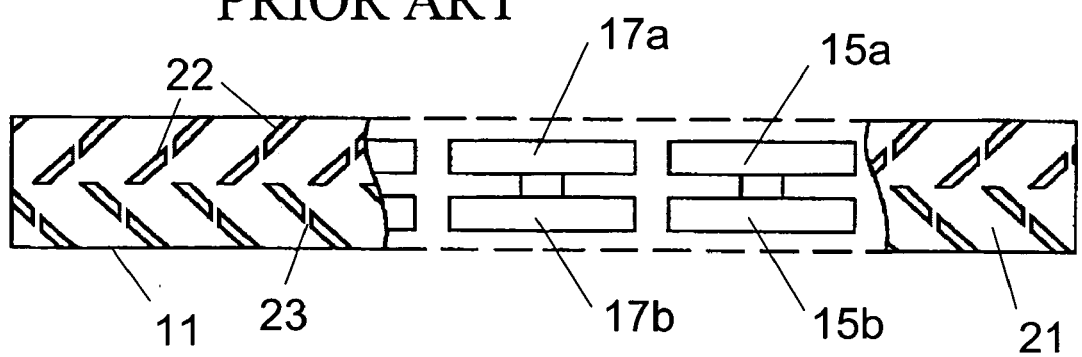
FIG. 2A shows a cut-away top view of a rubber endless track of the prior art.
Figure 3:
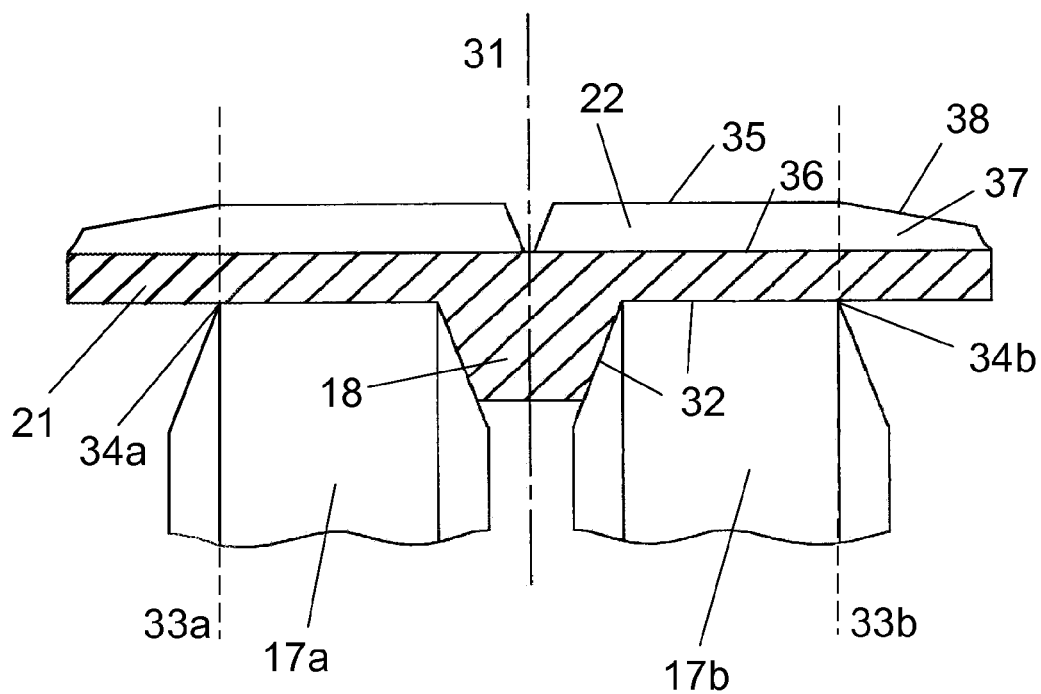
FIG. 3 shows a cross section of the rubber endless track of FIG. 2B along line 3-3.

Referring to FIG. 2A, each of the tandem and idler wheels is preferably a dual-wheel set, e.g., 15a and 15b and 17a and 17b, fixed to rotate together with a predetermined axial distance between the individual wheels of each set. Guide lugs 18 pass between and contact the pair of wheels in each dual-wheel set. Like other known endless tracks, the basic carcass of the track 11 includes a belt 21. Formed integral with the exterior surface of belt 21 are a plurality of terrain-contacting lugs 22 which, in this instance, are arranged in a staggered-chevron pattern. Exterior lugs 22 are further shown with a tension-reducing cut 23 perpendicular to the direction of travel of the track.

Figure 2B:
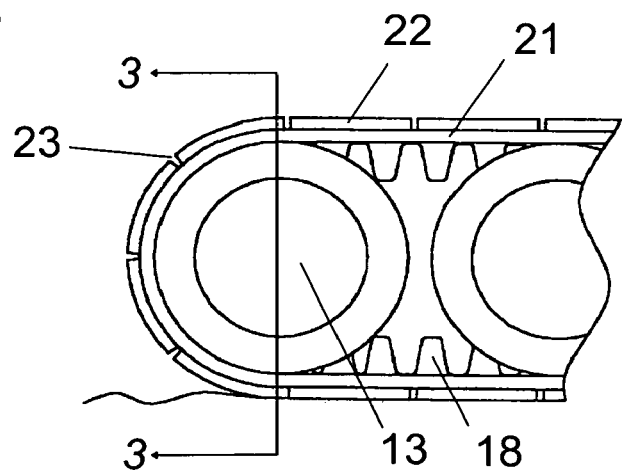
FIG. 2B shows an enlarged side view of a rubber endless track of the prior art.

As shown in FIG. 2B, as belt 21 passes circumferentially about end wheel 13, it conforms to the radius of curvature of wheel 13 and places lugs 22 under tension. Basic belt 21 of track 11 is relatively pliable, permitting the belt to change shape as it rides over the circumferential surfaces of the drive wheels. In contrast, heavy lugs 22 that contact the terrain 41 are much less pliable. Thus, there is a need for the tension-reducing cuts 23 that allow lugs 22 to open as the interior of the belt passes end wheels 13, 16, considerably reducing the tension. Each tension-reducing cut 23 is preferably made substantially through the entire thickness of each terrain-contacting lug 22.

In FIG. 3, a cross sectional view along line 3-3 of FIG. 2B, another feature of terrain-contacting lugs 22 is shown. A guide lug 18 is shown captured between dual-wheel tires 17a and 17b of idler wheel 17. A central plane 31 is shown running through the center of the endless track. Tire 17b is in frictional contact with belt 21 and captured lug 18 along a frictional contact surface 32. A pair of outer planes 33a, 33b parallel to and located a predetermined distance from central plane 31, intersect the outer edges of contact 34a, 34b between tires 17a, 17b and belt 21. Each terrain-contacting lug 22 has a top surface 35 that is parallel to the exterior surface 36 of belt 21, and also includes an outer cantilever section 37 beyond outer plane 33. Cantilever section 37 is biased to remain in flat alignment with the central section of the track within outer edges 34a, 34b. The top surface 38 of cantilever section 37 is tapered in the direction away from central plane 31. The tapering thickness dimension is selected so that, when the terrain is flat pavement, tapered portions 37 are substantially out of contact with the terrain, but, as the terrain becomes softer, the contact between tapered portions 37 and the terrain increases.

Figure 4:
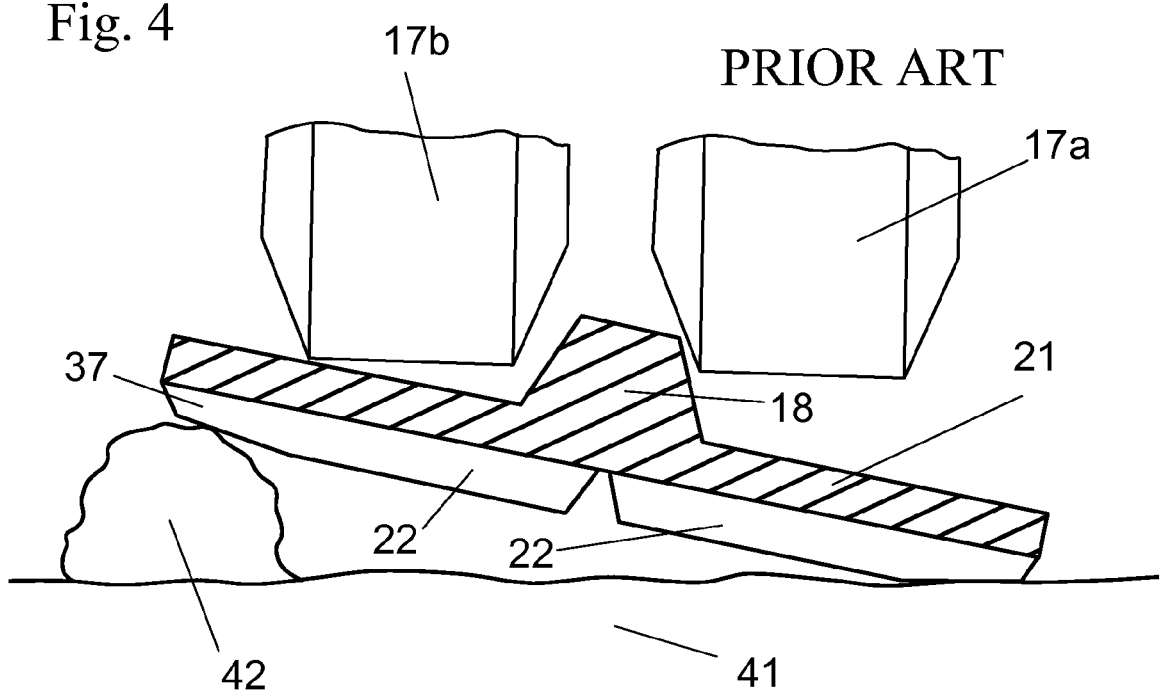
FIG. 4 shows a portion of a prior art rubber endless track at the moment of lateral contact with an obstacle.

Referring to FIG. 4, under certain conditions, such as moving over a sharp change in terrain elevation, a track of the prior art may become dislodged from the dual-wheel tires. As cantilever section 37 rides over a large obstacle 42, such as a rock, on an otherwise level terrain 41, the upward force on cantilever section 37 combines with the downward force from outside tire 17b to twist the track in a clockwise direction in FIG. 4. It is the stiffness of heavy lugs 22 that resists bending moments across the width of the track when relatively large object 42 encounters the cantilevered portion of the track. Such an encounter raises the dual-wheels. The dual-wheels, however, twist only slightly, leading to separation of the track from tires 17a, 17b. If obstacle 42 is large enough, guide lugs 18 may become completely dislodged from their captured position between the pairs of dual-wheel tires, 17a and 17b, thereby causing the track to come off of the tires.

Figure 5:
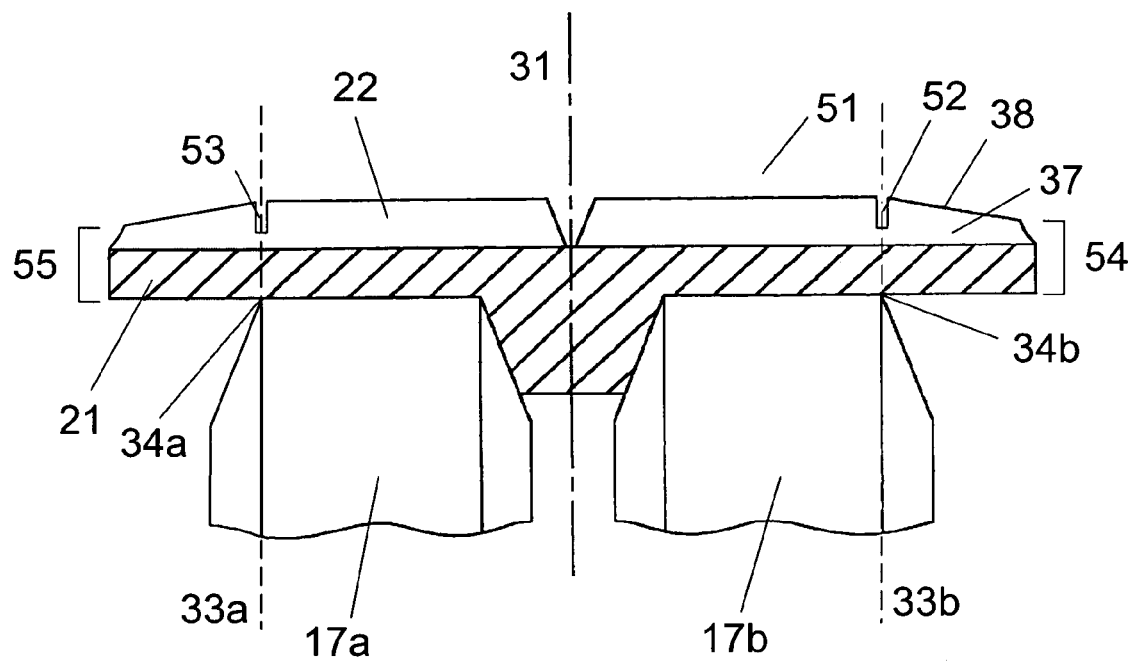
FIG. 5 shows a cross section of a track of the present invention in a view similar to that shown in FIG. 3.

FIG. 5 shows an embodiment of the present invention, from the same view as in FIG. 3, designed to reduce track roll-out. As in FIG. 3, a pair of outer planes 33a, 33b parallel to and located a predetermined distance from central plane 31, intersect the outer edges of contact 34a, 34b between tires 17a, 17b and belt 21. The modified endless track 51 preferably has the same cantilever section 37 biased to remain in flat alignment with the central section of the track within the outer edges 34a, 34b, and the same tapered top surface 38 of cantilever section 37, as well as tension-reducing cuts (23, see FIG. 2A) in terrain-contacting lugs 22. However, the endless track 51 of the present invention shown in FIG. 5 includes at least one cantilever cut 52, 53 extending beyond respective outer planes 33a, 33b. Although cantilever cuts 52, 53 are shown on both sides of track 51, a cantilever cut on only one side may be used without deviating from the spirit of the invention.

Several features of cantilever cuts 52, 53 should be noted. First, each cantilever cut is made into each terrain-contacting lug 22, and these cuts are made preferably along the entire length of the endless rubber track. Second, the cantilever cuts are preferably placed at the edge of each cantilever section 37 of the track so as to minimize the loss of frictional contact with the terrain. Thirdly, the cantilever cuts are preferably placed along outer plane 33. Fourthly, although cantilever cuts 52, 53 are preferably fore-and-aft type cuts as shown in FIG. 5, they may be of other shapes including angled cuts or cuts with curved sides. Finally, the cantilever cuts preferably extend at least halfway through the lugs and preferably have a width-to-depth ratio of 1:1 or less.

Figure 6:
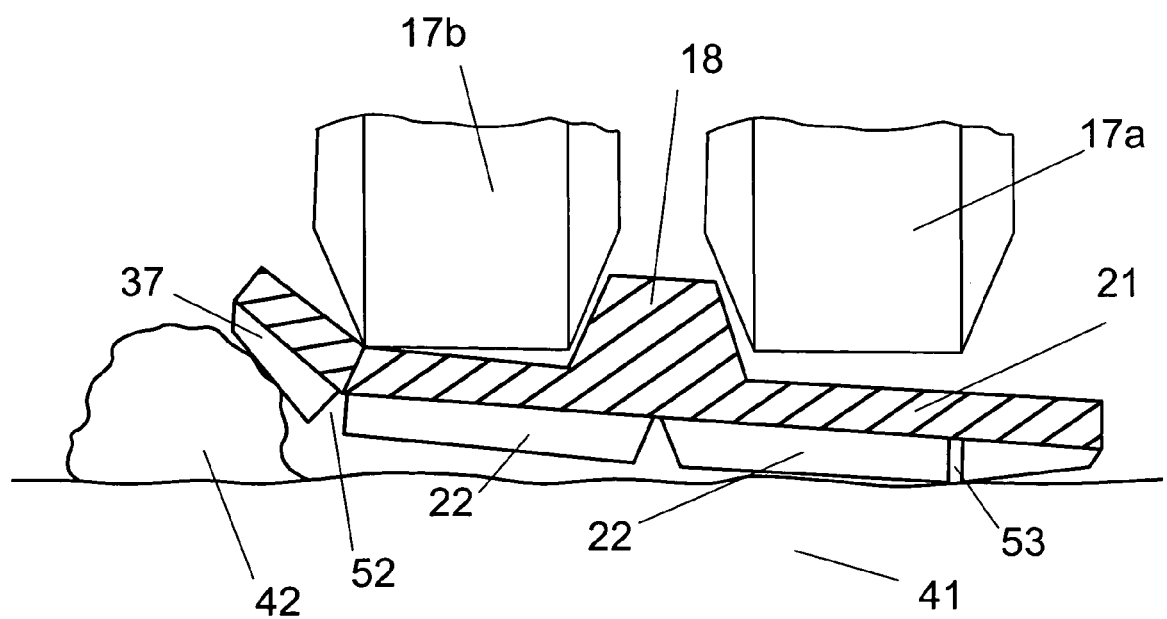
FIG. 6 shows a cross section of a track of the present invention at the moment of lateral contact with an obstacle similar to that illustrated in FIG. 4.

FIG. 6 shows a section of an endless rubber track in an embodiment of the present invention moving over a sharp change in terrain elevation caused by an obstacle similar to that disclosed in FIG. 4. As cantilever section 37 rides over large obstacle 42, on an otherwise level terrain 41, the upward force on cantilever section 37 is substantially relieved by a twisting of cantilever section 37 as cantilever cut 52 widens. The remainder of belt 21 is significantly less twisted than cantilever section 37, and guide lugs 18 remain substantially between dual-wheel tires 17a, 17b. Cantilever cut 52 narrows the section of the track along the plane of the cut, thereby allowing the cantilever section to buckle upward so that the twisting force is dissipated primarily in cantilever section 37. While dual-wheels 17a, 17b are still raised above the terrain, the rise is lessened, reducing the temporary misalignment of guide lug 18. Without this reduction of misalignment, it is possible for guide lugs 18 to come completely out of alignment, perhaps causing a serious misalignment or derailment of the track itself. Thus, the likelihood of roll-out is significantly reduced in the present invention, while the amount of desirable frictional contact between tires 17a, 17b and belt 21 and between lugs 22 and the terrain 41 is significantly greater than that achieved with prior art tracks under similar conditions.

Although the present invention has been described as an improvement for a specific type of rubber endless track moved by rubber tires, the invention is applicable to all rubber endless tracks moved by any rotational elements and having at least one cantilever section extending beyond the frictional contact surface.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An endless rubber track for use with a track-laying vehicle having a plurality of rotating elements for receiving and rotating the track so that the track provides supporting contact between the vehicle and a terrain over which the vehicle is to be moved, the endless track comprising:
   an endless belt having a terrain-facing surface facing outward from the belt and a frictional contact surface facing inward from the belt for frictional contact with at least two of the rotating elements, the belt comprising (a) a main section extending laterally between a pair of outer planes each plane being located at an outer edge of said frictional contact surface and being perpendicular to said frictional contact surface and (b) at least a first cantilevered outer section extending laterally from said main sections to a first respective outer edge of said frictional contact surface, each cantilevered outer section being biased to remain in flat alignment with said main section; and
   a plurality of terrain-contacting lugs formed integral with and extending outward from the terrain-facing surface, each lug having a lug-thickness dimension, said plurality of terrain-contacting lugs comprising at least one lateral lug extending laterally from the main section into said first cantilever section;
   wherein each lateral lug includes at least one cantilever cut, which is oriented parallel to a direction of travel of the track, said cantilever cut being specifically positioned in one of said outer planes.

2. The endless rubber track of claim 1, wherein said cantilever cut has a width-to-depth ratio of 1:1 or less.

3. The endless rubber track of claim 1, wherein said cantilever cut has a depth of at least half of the lug-thickness dimension.

4. The endless rubber track of claim 1, wherein said cantilever cut has a depth equal to the lug-thickness dimension.

5. The endless rubber track of claim 1 further comprising a second cantilevered outer section extending laterally from said main section to the second respective edge of said frictional contact surface, and said plurality of terrain-contacting lugs comprises at least one second lateral lug extending laterally from the main section into said second cantilevered outer section, a second cantilever cut being made into each second lateral lug and oriented parallel to the direction of travel of the track and being specifically positioned in the other of said outer planes.

6. The endless rubber track of claim 1, wherein the plurality of terrain-contacting lugs is arranged in a staggered-chevron configuration.

7. The endless rubber track of claim 1, wherein said lug-thickness dimension of each terrain-contacting lug has at least one tension-reducing cut formed therein, said tension-reducing cut being oriented perpendicular to the direction of travel of the belt.

8. The endless rubber track of claim 7, wherein said tension-reducing cut is made through the entire lug-thickness dimension of each lug.

9. The endless rubber track of claim 1, wherein the thickness of the terrain-contacting lugs in the cantilever section tapers from said outer plane to said respective outer edge of said frictional contact surface.

10. The endless rubber track of claim 1, wherein said rotating elements comprise individual wheels covered by rubber tires.

11. The endless rubber track of claim 10 further comprising a plurality of alignment lugs formed integral with and extending outward from said frictional contact surface to maintain the alignment of the track relative to the circumferential surfaces of said tires.

12. The endless rubber track of claim 11, wherein:
   said rotating elements further comprise dual-wheel sets, covered by rubber tires and fixed to rotate together with a predetermined axial distance between the individual wheels of each dual-wheel set; and
   said alignment lugs are spaced from each other in alignment with a central plane of the track, said alignment lugs having a width selected to mate with said predetermined axial distance between the individual wheels of each dual-wheel set for centering the track thereon.

13. The endless rubber track of claim 1 further comprising a plurality of guide lugs interiorly located on said endless belt, said guide lugs being captured between said rotating elements and being formed to contact a pair of mating surfaces formed between said rotating elements.

14. The endless rubber track of claim 13, wherein when said first respective outer edge of the track passes over a sharply uneven terrain, said cantilever cut allows said first respective outer edge of said endless belt to lift away from the flat surface of said main section under said rotating elements, thereby preventing a severe twisting of the endless belt that might otherwise cause said guide lugs to tip out of said mating surfaces formed between said rotating elements.

15. The endless rubber track of claim 1, wherein said cantilever cut allows said first respective outer edge of said endless belt to lift away from the flat surface of said main section under said rotating elements.

16. An endless rubber track for use with a track-laying vehicle having a plurality of rotating elements for receiving and rotating the track so that the track provides supporting contact between the vehicle and a terrain over which the vehicle is to be moved, the endless track comprising:
   an endless belt having a terrain-facing surface facing outward from the belt and a frictional contact surface facing inward from the belt for frictional contact with at least two of the rotating elements, the belt comprising:
      a main section extending laterally between a pair of outer planes each plane being located at an outer edge of said frictional contact surface and being perpendicular to said frictional contact surface;
      a plurality of guide lugs interiorly located on said main section, said guide lugs being captured between said rotating elements and being formed to contact a pair of mating surfaces formed between said rotating elements; and
      at least a first cantilevered outer section extending laterally from said main sections to a first respective outer edge of said frictional contact surface, each cantilevered outer section being biased to remain in flat alignment with said main section; and
   a plurality of terrain-contacting lugs formed integral with and extending outward from the terrain-facing surface, each lug having a lug-thickness dimension, said plurality of terrain-contacting lugs comprising at least one lateral lug extending laterally from the main section into said first cantilever section;
   wherein each lateral lug includes a cantilever cut, which is oriented parallel to a direction of travel of the track and placed in one of said outer planes such that when said first respective outer edge of the track passes over a sharply uneven terrain, said cantilever cut allows said first respective outer edge of said endless belt to lift away from the flat surface of said main section under said rotating elements, thereby preventing a severe twisting of the endless belt that might otherwise cause said guide lugs to tip out of said mating surfaces formed between said rotating elements.

* * * * *